United States Patent
Tashino et al.

(10) Patent No.: US 6,930,069 B2
(45) Date of Patent: Aug. 16, 2005

(54) POLYMERIZATION CATALYST FOR OLEFINS AND PROCESS FOR POLYMERIZATION OF OLEFINS

(75) Inventors: Kunihiko Tashino, Kanagawa (JP); Maki Sato, Kanagawa (JP)

(73) Assignee: Toho Catalyst Co., Ltd., Kurobe (JP)

( * ) Notice: Subject to any disclaimer, the term of this patent is extended or adjusted under 35 U.S.C. 154(b) by 21 days.

(21) Appl. No.: 10/471,236

(22) PCT Filed: Nov. 12, 2002

(86) PCT No.: PCT/JP02/11773

§ 371 (c)(1), (2), (4) Date: Sep. 9, 2003

(87) PCT Pub. No.: WO03/044062

PCT Pub. Date: May 30, 2003

(65) Prior Publication Data

US 2004/0077488 A1   Apr. 22, 2004

(30) Foreign Application Priority Data

Nov. 21, 2001   (JP) ........................ 2001-356381

(51) Int. Cl.$^7$ ................... B01J 31/00; B01J 37/00; C08F 4/02; C08F 4/60

(52) U.S. Cl. .............. 502/103; 502/104; 502/114; 502/115; 502/116; 502/127; 525/10; 526/72; 526/125; 526/126

(58) Field of Search ................ 502/103, 104, 502/114, 115, 116, 127; 525/10; 526/72, 125, 126

(56) References Cited

U.S. PATENT DOCUMENTS

| | | | |
|---|---|---|---|
| 4,526,941 A | * | 7/1985 | Sakurai et al. ............ 526/127 |
| 6,031,058 A | * | 2/2000 | McIntosh et al. .......... 526/171 |

FOREIGN PATENT DOCUMENTS

| | | |
|---|---|---|
| JP | 3-157409 | 7/1991 |
| JP | 10-218926 | 8/1998 |
| JP | 11-222504 | 8/1999 |
| JP | 11-246620 | 9/1999 |
| JP | 2000-204111 | 7/2000 |
| WO | 01/81434 | 11/2001 |

* cited by examiner

Primary Examiner—J. A. Lorengo
Assistant Examiner—Jennine Brown
(74) Attorney, Agent, or Firm—Oblon, Spivak, McClelland, Maier & Neustadt, P.C.

(57) ABSTRACT

Olefin polymers with a broad molecular weight distribution can be obtained while maintaining the high stereoregularity of the polymers by polymerizing olefins using a catalyst comprising (A) a solid catalyst component prepared by contacting (a) a dialkoxymagnesium, (b) a tetravalent titanium halide compound, and (c) an electron donor compound one another, (B) an organoaluminum compound of the formula $R^1_p AlQ_{3-p}$, and (C) an aminosilane compound of the formula $R^2R^3Si(OR^4)_2$.

16 Claims, 1 Drawing Sheet

---

(A) Transition metal components (a) Dialkoxy magnesium (b) Tetravalent titanium halide compound (c) Electron-donating compound Contact (B) Organoaluminum compound $R^1_p AlQ_{3-p}$ $0 < p \leq 3$ (C) Aminosilane compound $R^2R^3Si(OR^4)_2$ Contact — Olefin

POLYMERIZATION CATALYST FOR OLEFINS AND PROCESS FOR POLYMERIZATION OF OLEFINS

TECHNICAL FIELD

The present invention relates to a catalyst for olefin polymerization which can produce olefin polymers with a broad molecular weight distribution in a high yield while maintaining high stereoregularity of the olefin polymers and to a process for polymerizing olefins.

BACKGROUND ART

Conventionally, a number of processes for polymerizing or copolymerizing olefins in the presence of a catalyst for olefin polymerization comprising a solid catalyst component containing magnesium, titanium, an electron donor compound, and halogen as the essential components, an organoaluminum compound, and an organosilicon compound have been proposed.

For example, Japanese Unexamined Patent Publication (hereinafter referred to as JP-A) No. 63310/1982 and JP-A No. 63311/1982 propose a method for polymerizing olefins with three or more carbon atoms, in which a combined catalyst comprising a solid catalyst component containing a magnesium compound, a titanium compound, and an electron donor, an organoaluminum compound, and an organosilicon compound having a Si—O—C bond is used. However, because these methods are not necessarily satisfactory for producing highly stereoregular polymers in a high yield, further improvement of these methods has been desired.

JP-A No. 3010/1988 proposes a catalyst for olefin polymerization and a process for polymerizing olefins in the presence of the catalyst. The catalyst for olefin polymerization comprises a solid catalyst component, prepared by processing with heat a powdered product obtained by contacting dialkoxymagnesium, diester of an aromatic dicarboxylic acid, aromatic hydrocarbon, and titanium halide one another, an organoaluminum compound, and an organosilicon compound.

JP-A No. 315406/1989 proposes another catalyst for olefin polymerization and a process for polymerizing olefins in the presence of this catalyst. The catalyst for olefin polymerization comprises a solid catalyst component prepared by causing a suspension containing diethoxymagnesium and alkylbenzene to contact titanium tetrachloride, reacting the suspension with phthalic acid dichloride, and causing the resulting solid product to contact titanium tetrachloride in the presence of alkylbenzene, an organoaluminum compound, and an organosilicon compound.

JP-A No. 84404/1990 proposes a catalyst for olefin polymerization comprising a solid titanium catalyst component containing magnesium, titanium, and halogen as the essential components obtained by contacting a magnesium compound and a titanium compound one another, an organoaluminum compound catalyst component, and an organosilicon compound catalyst component containing a cyclopentyl group, cyclopentenyl group, cyclopentadienyl group, or a derivative of these groups, as well as a process for polymerizing or copolymerizing olefins in the presence of this catalyst.

All of the above-described conventional technologies have attained excellent results in improving the catalyst activity to enable omission of an ash-removal step for removing catalyst residues such as chlorine and titanium from the formed polymers, improving the yield of stereoregular polymers, and improving the durability of the catalyst activity during the polymerization.

However, olefin polymers obtained by polymerizing olefins using a catalyst for olefin polymerization containing this type of highly active catalyst component, an organoaluminum compound, and an organosilicon compound have been found to possess a molecular weight distribution narrower than that of olefin polymers obtained by polymerizing olefins using a catalyst for olefin polymerization in which the conventional titanium trichloride catalyst component is combined with an organosilicon compound and, optionally, an electron donor compound as the third component. The narrow molecular weight distribution leads to a low melting viscoelasticity of the polymer, which gives rise to an impaired outward appearance of the final products (polyolefins). The application of the olefin polymers must be limited to a certain degree.

Various ideas have been put into practice in an attempt to solve this problem. One example is using multi-stage polymerization to obtain polyolefin with a broad molecular weight distribution. However, the multi-stage polymerization involves undesirable features including a high cost such as repetition of a complicated polymerization process and reclaiming of a chelating agent used in the polymerization.

JP-A No. 7703/1991 proposes a process for polymerizing olefins in the presence of a catalyst for olefin polymerization comprising a solid titanium catalyst component containing magnesium, titanium, halogen, and an electron donor as the essential components, an organoaluminum compound, and at least two electron donors (organosilicon compounds).

The applicants claim that the target polyolefin with a broad molecular weight distribution can be obtained without requiring a complicated multi-stage polymerization. However, the requirement of using two or more organosilicon compounds as electron donors during polymerization makes the process complicated.

Accordingly, an object of the present invention is to solve the above problems remaining in the prior art and to provide a catalyst for olefin polymerization and a process for polymerizing olefins, which can produce olefin polymers having a broad molecular weight distribution by a simple procedure while maintaining high stereoregularity.

DISCLOSURE OF THE INVENTION

In view of this situation, the inventors of the present invention have conducted extensive studies and have found that (1) an olefin polymer having a broad molecular weight distribution and high stereoregularity can be obtained in a high yield by polymerizing olefins using a catalyst comprising a specific solid catalyst component made from dialkoxymagnesium, tetravalent titanium halide, and an electron donor compound as raw materials, an organoaluminum compound, and an aminosilane compound having a specific structure and that (2) the catalyst of the present invention can overcome the problem of decreased activity against hydrogen of the catalyst using a conventional aminosilane compound as an electron donor compound during the polymerization, which results in producing high melt flow rate polymers, and the catalyst of the present invention can produce polymers with a broader molecular weight distribution and can exhibit activity against hydrogen the same as or higher than conventional catalysts, producing high melt flow rate polymers. These findings have led to the completion of the present invention.

Specifically, the present invention provides a catalyst for olefin polymerization comprising:

(A) a solid catalyst component prepared by contacting (a) a dialkoxymagnesium, (b) a tetravalent titanium halide compound, and (c) an electron donor compound to one another, (B) an organoaluminum compound of the following formula (1), $$R^1_p AlQ_{3-p} \quad (1)$$

wherein $R^1$ represents an alkyl group having 1 to 4 carbon atoms, Q represents a hydrogen atom or a halogen atom, and p represents a real number satisfying the formula 0<p≦3, and (C) an aminosilane compound of the following formula (2), $$R^2 R^3 Si(OR^4)_2 \quad (2)$$

wherein $R^2$ represents a perhydroquinolino group or perhydroisoquinolino group, $R^3$ represents a perhydroquinolino group, perhydroisoquinolino group, an alkyl group having 1 to 12 carbon atoms, a cycloalkyl group, phenyl group, vinyl group, allyl group, or aralkyl group, the $R^3$ group being either the same as or different from the $R^2$ group, and $R^4$ individually represents an alkyl group having 1 to 4 carbon atoms, cycloalkyl group, phenyl group, vinyl group, allyl group, or aralkyl group.

The present invention further provides a process for polymerizing olefins characterized by polymerizing or copolymerizing olefins in the presence of a catalyst for olefin polymerization comprising:

(A) a solid catalyst component prepared by contacting (a) a dialkoxymagnesium, (b) a tetravalent titanium halide compound, and (c) an electron donor compound to one another, (B) an organoaluminum compound of the following formula (1), $$R^1_p AlQ_{3-p} \quad (1)$$

wherein $R^1$ represents an alkyl group having 1 to 4 carbon atoms, Q represents a hydrogen atom or a halogen atom, and p represents a real number satisfying the formula 0<p≦3, and (C) an aminosilane compound of the following formula (2)

$$R^2 R^3 Si(OR^4)_2 \quad (2)$$

wherein $R^2$ represents a perhydroquinolino group or perhydroisoquinolino group, $R^3$ represents a perhydroquinolino group, perhydroisoquinolino group, an alkyl group having 1 to 12 carbon atoms, a cycloalkyl group, phenyl group, vinyl group, allyl group, or aralkyl group, the $R^3$ group being either the same as or different from the $R^2$ group, and $R^4$ individually represents an alkyl group having 1 to 4 carbon atoms, a cycloalkyl group, phenyl group, vinyl group, allyl group, or aralkyl group.

The perhydroquinolino group in the formula (2) indicates a monovalent group produced from perhydroquinoline by eliminating one hydrogen atom bonding to the nitrogen atom possessed by the perhydroquinoline. The perhydroisoquinolino group indicates a monovalent group produced from perhydroisoquinoline by eliminating one hydrogen atom bonding to the nitrogen atom possessed by the perhydroisoquinoline. The both perhydroquinolino group and perhydroisoquinolino group are represented by $C_9H_{16}N-$, wherein N is a free radical.

BEST MODE FOR CARRYING OUT THE INVENTION

Figure 1:
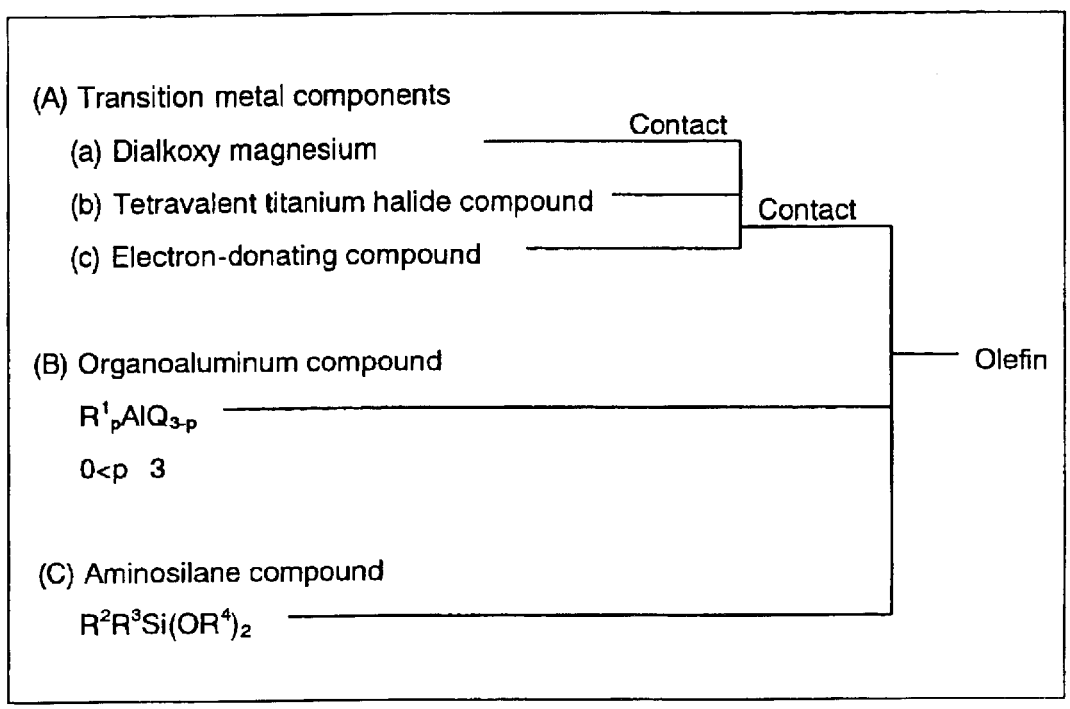
FIG. 1 is a flowchart showing a process for preparing the catalyst component and polymerization catalyst of the present invention.

As the dialkoxymagnesium (a) (hereinafter may be referred to as "component (a)") used for preparing the solid catalyst component (A) (hereinafter may be referred to as "component (A)") in the catalyst for olefin polymerization of the present invention, a compound represented by the formula $Mg(OR^5)(OR^6)$, wherein $R^5$ and $R^6$ individually represent an alkyl group having 1 to 10 carbon atoms, is preferable. Specific examples include dimethoxymagnesium, diethoxymagnesium, dipropoxymagnesium, dibutoxymagnesium, ethoxymethoxymagnesium, ethoxypropoxymagnesium, and butoxyethoxymagnesium. Of these, diethoxymagnesium is particularly preferable. These dialkoxymagnesium compounds may be prepared by reacting metallic magnesium with an alcohol in the presence of a halogen or a halogen-containing metal compound. The above dialkoxymagnesium compounds may be used either individually or in combination of two or more.

The dialkoxymagnesium compound used for preparing the component (A) in the present invention may be in the form of either granules or powder and either amorphous or spherical in the configuration. For example, when spherical dialkoxymagnesium is used, the resulting polymer is in the form of a powder having a more excellent granular form and a narrower particle distribution. This improves handling and processability of the polymer powder produced during polymerization operation and eliminates problems such as clogging caused by fine particles contained in the polymer powder.

The spherical dialkoxymagnesium need not necessarily be completely spherical, but may be oval or potato-shaped. Specifically, the particles may have a ratio (1/w) of the major axis diameter (1) to the minor axis diameter (w) usually of 3 or less, preferably of 1 to 2, and more preferably of 1 to 1.5.

The dialkoxymagnesium with an average particle size of 1 to 200 μm can be used. A more preferable average particle size is 5 to 150 μm. In the case of spherical dialkoxymagnesium, the average particle size is usually 1 to 100 μm, preferably 5 to 50 μm, and more preferably 10 to 40 μm. A powder having a narrow particle size distribution with a small fine and coarse powder content is preferably used. Specifically, the content of particles with a diameter of 5 μm or less is 20% or less, and preferably 10% or less. On the other hand, the content of particles with a diameter of 100 μm or more should be 10% or less, and preferably 5% or less. Moreover, the particle size distribution represented by ln (D90/D10), wherein D90 is a particle size of 90% of the integrated particle size and D10 is a particle size of 10% of the integrated particle size, is 3 or less, and preferably 2 or less.

Methods for producing such spherical dialkoxymagnesium are described in, for example, JP-A No. 41832/1983, JP-A No. 51633/1987, JP-A No. 74341/1991, JP-A No. 368391/1992, and JP-A No. 73388/1996.

The tetravalent titanium halide compound (b) (hereinafter may be referred to as "component (b)") used for preparing the component (A) in the present invention is individually or in combination of two or more compounds selected from titanium halides and alkoxytitanium halides of the formula $Ti(OR^7)_nX_{4-n}$, wherein $R^7$ indicates an alkyl group having 1 to 4 carbon atoms, X is a halogen atom, and n is an integer of $0 \leq n \leq 4$.

Specific examples include, as titanium halides, titanium tetrahalides such as titanium tetrachloride, titanium tetrabromide, and titanium tetraiodide and, as alkoxytitanium halides, methoxytitanium trichloride, ethoxytitanium trichloride, propoxytitanium trichloride, n-butoxytitanium trichloride, dimethoxytitanium dichloride, diethoxytitanium dichloride, dipropoxytitanium dichloride, di-n-butoxytitanium dichloride, trimethoxytitanium chloride, triethoxytitanium chloride, tripropoxytitanium chloride, and tri-n-butoxytitanium chloride. Of these, titanium tetrahalides are preferable, with titanium tetrachloride being particularly preferable. These titanium compounds may be used either individually or in combination of two or more.

The electron donor compound used for preparing the solid catalyst component (A) (hereinafter may be simply referred to as "component (c)") is an organic compound containing an oxygen atom or a nitrogen atom. Alcohols, phenols, ethers, esters, ketones, acid halides, aldehydes, amines, amides, nitriles, isocyanates, and organosilicon compounds containing a Si—O—C bond can be given as examples.

Specific examples include: alcohols such as methanol, ethanol, n-propanol, and 2-ethylhexanol; phenols such as phenol and cresol; ethers such as methyl ether, ethyl ether, propyl ether, butyl ether, amyl ether, diphenyl ether, 9,9-bis(methoxymethyl)fluorene, and 2-isopropyl-2-isopentyl-1,3-dimethoxypropane; monocarboxylic acid esters such as methyl formate, ethyl acetate, vinyl acetate, propyl acetate, octyl acetate, cyclohexyl acetate, ethyl propionate, ethyl butyrate, methyl benzoate, ethyl benzoate, propyl benzoate, butyl benzoate, octyl benzoate, cyclohexyl benzoate, phenyl benzoate, methyl p-toluate, ethyl p-toluate, methyl anisate, and ethyl anisate; dicarboxylic acid esters such as diethyl maleate, dibutyl maleate, dimethyl adipate, diethyl adipate, dipropyl adipate, dibutyl adipate, diisodecyl adipate, dioctyl adipate, dimethyl phthalate, diethyl phthalate, dipropyl phthalate, dibutyl phthalate, dipentyl phthalate, dihexyl phthalate, diheptyl phthalate, dioctyl phthalate, dinonyl phthalate, and didecyl phthalate; ketones such as acetone, methyl ethyl ketone, methyl butyl ketone, acetophenone, and benzophenone; acid halides such as phthalic acid dichloride and terephthalic acid dichloride; aldehydes such as acetaldehyde, propionaldehyde, octylaldehyde, and benzaldehyde; amines such as methylamine, ethylamine, tributylamine, piperidine, aniline, and pyridine; amides such as oleic acid amide and stearic acid amide; nitriles such as acetonitrile, benzonitrile, and tolunitrile; and isocyanates such as methyl isocyanate and ethyl isocyanate.

As examples of the organosilicon compound having an Si—O—C bond, phenylalkoxysilane, alkylalkoxysilane, phenylalkylalkoxysilane, cycloalkylalkoxysilane, and cycloalkylalkylalkoxysilane can be given.

Of these electron donor compounds, esters, particularly diesters of an aromatic dicarboxylic acid are preferable, with phthalic acid diesters and phthalic acid diester derivatives being ideal compounds. Specific examples of the phthalic acid diester include the following compounds: dimethyl phthalate, diethyl phthalate, di-n-propyl phthalate, diisopropyl phthalate, di-n-butyl phthalate, diisobutyl phthalate, ethylmethyl phthalate, methyl(isopropyl) phthalate, ethyl(n-propyl) phthalate, ethyl(n-butyl) phthalate, ethyl(isobutyl) phthalate, di-n-pentyl phthalate, diisopentyl phthalate, dineopentyl phthalate, dihexyl phthalate, di-n-heptyl phthalate, di-n-octyl phthalate, bis(2,2-dimethylhexyl) phthalate, bis(2-ethylhexyl) phthalate, di-n-nonyl phthalate, diisodecyl phthalate, bis(2,2-dimethylheptyl) phthalate, n-butyl(isohexyl) phthalate, n-butyl(2-ethylhexyl) phthalate, n-pentylhexyl phthalate, n-pentyl(isohexyl) phthalate, isopentyl(heptyl) phthalate, n-pentyl(2-ethylhexyl) phthalate, n-pentyl(isononyl) phthalate, isopentyl(n-decyl) phthalate, n-pentylundecyl phthalate, isopentyl(isohexyl) phthalate, n-hexyl(2,2-dimethylhexyl) phthalate, n-hexyl(2-ethylhexyl) phthalate, n-hexyl(isononyl) phthalate, n-hexyl(n-decyl) phthalate, n-heptyl(2-ethylhexyl) phthalate, n-heptyl(isononyl) phthalate, n-heptyl(neodecyl) phthalate, and 2-ethylhexyl(isononyl) phthalate. One or more of these compounds can be used.

As the phthalic acid diester derivatives, compounds derived from phthalic acid diesters by replacing one or two hydrogen atoms on the benzene ring, to which the two alkoxycarbonyl groups of the phthalic acid diester bond, with an alkyl group having 1 to 5 carbon atoms or a halogen atom such as a chlorine, bromine, or fluorine are preferably used. The catalyst for olefin polymerization obtained by combining the solid catalyst component prepared by using these phthalic acid diester derivatives as the electron donor compound (c) can remarkably broaden the molecular weight distribution of the polymer, as well as increase the melt flow rate of the polymer due to the high activity or high response of the solid catalyst component against hydrogen even in the use of a smaller or equivalent amount of hydrogen during the polymerization. As specific examples, dineopentyl 4-methylphthalate, dineopentyl 4-ethylphthalate, dineopentyl 4,5-dimethylphthalate, dineopentyl 4,5-diethylphthalate, diethyl 4-chlorophthalate, di-n-butyl 4-chlorophthalate, dineopentyl 4-chlorophthalate, diisobutyl 4-chlorophthalate, diisohexyl 4-chlorophthalate, diisooctyl 4-chlorophthalate, diethyl 4-bromophthalate, di-n-butyl 4-bromophthalate, dineopentyl 4-bromophthalate, diisobutyl 4-bromophthalate, diisohexyl 4-bromophthalate, diisooctyl 4-bromophthalate, diethyl 4,5-dichlorophthalate, di-n-butyl 4,5-dichlorophthalate, diisohexyl 4,5-dichlorophthalate, and diisooctyl 4,5-dichlorophthalate can be given. Of these, dineopentyl 4-bromophthalate, di-n-butyl 4-bromophthalate, and diisobutyl 4-bromophthalate are preferable.

The above ester compounds are preferably used in combination of two or more. In this instance, the esters are preferably combined so that the total carbon atom number in the alkyl group possessed by one ester may differ four or more from that possessed by another ester.

The component (A) of the present invention can be preferably prepared by contacting the above components (a), (b), and (c) one another in an aromatic hydrocarbon (d) (hereinafter may be simply referred to as "component (d)"). Aromatic hydrocarbons having a boiling point of 50° C. to 150° C. such as toluene, xylene, and ethylbenzene are preferably used as the component (d). These aromatic hydrocarbons can be used either individually or in combination of two or more.

In addition to the above components (a) to (c) and, optionally, the component (d), a polysiloxane (hereinafter may be simply referred to as "component (e)") can be desirably used for preparing the solid catalyst component (A) of the present invention. The use of the catalyst of the present invention containing the solid catalyst component prepared by using a polysiloxane can ensure a broader molecular weight distribution and improve stereoregularity or crystalinity of the resulting polymer, as well as reduce fine powder in the polymer. It is also desirable to use the polysiloxane (e) for preparing the solid catalyst component (A) in addition to the above component (a), the component (b), phthalic acid diester derivatives given as examples of the component (c), and the component (d). A polysiloxane is a polymer possessing siloxane bonds (—Si—O—) in the main chain. Polysiloxanes are generally called silicone oil. Those used in the present invention are chain-structured, partially hydrogenated, cyclic, or denatured polysiloxanes which are liquids or viscous substances at normal temperatures with a viscosity at 25° C. in the range of 2 to 10,000 cSt, and preferably in the range of 3 to 500 cSt.

As examples of the chain-structured polysiloxane, dimethylpolysiloxane and methylphenylpolysiloxane can be given; as examples of the partially hydrogenated polysiloxane, methyl hydrogen polysiloxanes with a hydrogenation degree of 10 to 80% can be given; as examples of the cyclic polysiloxane, hexamethylcyclotrisiloxane, octamethylcyclotetrasiloxane, decamethylcyclopentasiloxane, 2,4,6-trimethylcyclotrisiloxane, 2,4,6,8-tetramethylcyclotetrasiloxane can be given; as examples of the modified polysiloxane, higher fatty acid group-substituted dimethylsiloxane, epoxy group-substituted dimethylsiloxane, and polyoxyalkylene group-substituted dimethylsiloxane can be given. Of these, decamethylcyclopentasiloxane and dimethylpolysiloxane are preferable, with decamethylcyclopentasiloxane being particularly preferable.

In addition to the above essential components, an aluminum compound (f) such as aluminum trichloride, diethoxyaluminum chloride, diisopropoxyaluminum chloride, ethoxyaluminum dichloride, isopropoxyaluminum dichloride, butoxyaluminum dichloride, or triethoxyaluminum can be used for preparing the solid catalyst component (A) for olefin polymerization of the present invention. Such an aluminum compound (f) may be hereinafter referred to as "component (f)". Of these, aluminum trichloride is preferable. The use of a solid catalyst component prepared by using this aluminum compound ensures production of olefin polymers having not only a broader molecular weight distribution, but also reasonably high stereoregularity even with a high isoblock content. Such polymers are particularly suitable for fabricating sheets and films. In addition, if the component (f) and component (e) are used together with the components (a) to (c), and preferably together with the components (a) to (d), for preparing the solid catalyst component (A), the molecular weight distribution of the produced polymers can be remarkably broadened. It is also desirable to use the component (f) and component (e) for preparing the solid catalyst component (A) together with the component (a), component (b), a phthalic acid diester derivative as the component (c), and the component (d). When using the above aluminum compound for preparing the solid catalyst component (A), the aluminum compound (f) is preferably added in the presence of the component (B).

The process for preparing the component (A) of the present invention will now be described.

One specific example of the process for preparing the solid component (A) comprises suspending the dialkoxymagnesium compound (a) in an alcohol, a halogenated hydrocarbon solvent, the tetravalent titanium halide (b), or the aromatic hydrocarbon (d), and causing the electron donor compound (c) such as a phthalic acid diester and/or the tetravalent titanium halide (b) to contact the suspension. A spherical solid catalyst component with a narrow particle size distribution can be obtained by this process using a spherical magnesium compound. Such a spherical solid catalyst component with a narrow particle size distribution can also be obtained without using a spherical magnesium compound if particles are formed by a spray dry method in which a solution or suspension is sprayed and dried using a sprayer, for example.

These components contact one another in a vessel equipped with a stirrer in an inert gas atmosphere from which water and the like have been removed while stirring. The contact, temperature, which is a temperature when these components are caused to contact, may be either the same as or different from the reaction temperature. When the components contact one another by stirring for preparing the mixture or are dispersed or suspended for a denaturing treatment, the components may be stirred, dispersed, or suspended at a comparatively low temperature of around room temperature. When a reaction product is to be obtained by reacting the components after the contact, the components are preferably stirred in a temperature range of 40° C. to 130° C. The reaction does not sufficiently proceed at a reaction temperature below 40° C., resulting in a solid component with inadequate properties. On the other hand, control of the reaction becomes difficult at a temperature above 130° C. due to significant vaporization of the solvent and the like. The reaction time is one minute or more, preferably ten minutes or more, and still more preferably 30 minutes or more.

As preferable processes for preparing the solid catalyst component (A) of the present invention, a process comprising suspending the component (a) in the component (d), causing the resulting suspension to contact the component (b), then the component (c), and causing these components to react, and a process comprising suspending the component (a) in the component (d), causing the resulting suspension to contact the component (c), then the component (b), and causing these components to react can be given. When the component (e) is used for preparing the solid catalyst component (A), a process of suspending the component (a) in the component (d), causing the suspension to contact the component (b) and component (c) in an optional order, causing the component (e) to contact the resulting mixture, then causing these components to react is preferably employed. When the component (f) is used for preparing the solid catalyst component (A), a process of suspending the component (a) and component (f) in the component (d), causing the resulting suspension to contact the component (b) and component (c) in an optional order, and causing these components to react is preferably employed. Even in the case of using the component (f), it is possible to cause the component (e) to contact the mixture obtained by causing the component (b) and component (c) to contact the suspension in an optional order, and then causing these components to react.

The following examples are given more specifically as the preferable order of contacting the components one another for preparing the solid catalyst component (A) of the present invention.

(1) (a)→(d)→(b)→(c)→<<intermediate washing→(d)→(b)>>→final washing→solid catalyst component (A)

(2) (a)→(d)→(c)→(b)→<<intermediate washing→(d)→(b)>>→final washing→solid catalyst component (A)

(3) (a)→(d)→(b)→(c)→<<intermediate washing→(d)→(b)→(c)>>→final washing→solid catalyst component (A)

(4) (a)→(d)→(b)→(c)→<<intermediate washing→(d)→(c)→(b)>>→final washing→solid catalyst component (A)

(5) (a)→(d)→(c)→(b)→<<intermediate washing→(d)→(b)→(c)>>→final washing→solid catalyst component (A)

(6) (a)→(d)→(c)→(b)→<<intermediate washing→(d)→(c)→(b)>>→final washing→solid catalyst component (A)

(7) (a)→(d)→(b)→(c)→(e)→<<intermediate washing→(d)→(b)>>→final washing→solid catalyst component (A)

(8) (a)→(d)→(c)→(b)→(e)→<<intermediate washing→(d)→(b)>>→final washing→solid catalyst component (A)

The catalyst activity can be further improved if the steps in the double parentheses << >> in the above processes of contact are repeated several times, if required. The components (b) and (d) used in the steps in the double parentheses << >> may be either newly added components or residues from the previous steps. In addition to the washing steps indicated in the above processes (1) to (8), the intermediate products in any of the above contact steps may be washed with a hydrocarbon compound which is liquid at normal temperatures.

Based on the above description, a particularly preferable process for preparing the solid catalyst component (A) comprises suspending the dialkoxymagnesium compound (a) or the dialkoxymagnesium compound (a) and the component (f) in the aromatic hydrocarbon (d) having a boiling point of 50° C. to 150° C., causing the tetravalent titanium halide (b) to contact the suspension, and reacting the mixture. In the above process, one or more electron donor compounds (c) such as phthalic acid diesters are caused to contact the suspension at a temperature of −20° C. to 130° C., either before or after the tetravalent titanium halide (b) is contacted, the electron donor compound (c) is further caused to contact, and the linear or cyclic polysiloxane (e) is caused to contact at a temperature of 20° C. to 130° C. Then, the mixture is reacted to obtain a solid reaction product (1). In this instance, it is desirable to carry out an aging reaction at a low temperature either before or after the above one or more electron donor compounds (c) are caused to contact the suspension. After washing the solid reaction product (1) with a hydrocarbon compound which is liquid at normal temperatures (intermediate washing), the tetravalent titanium halide (b) is again caused to contact the solid reaction product (1) in the presence of an aromatic hydrocarbon compound at a temperature of −20° C. to 100° C., to obtain a solid reaction product (2). As required, the intermediate washing and the reaction may be further repeated several times. When reacting the mixture after again causing the tetravalent titanium halide compound (b) to contact, the electron donor compound (c) maybe caused to contact together. Next, the solid reaction product (2) is washed with a hydrocarbon compound which is liquid at normal temperatures (final washing) to obtain the solid catalyst component (A).

Preferable conditions of the above reactions and washing operations are as follows.

Low temperature aging reaction: −20° C. to 70° C., preferably −10° C. to 60° C., and more preferably 0° C. to 30° C., for 1 minute to 6 hours, preferably 5 minutes to 4 hours, and particularly preferably 10 minutes to 3 hours.

Reaction: 40° C. to 130° C., preferably 70° C. to 120° C., and particularly preferably 80° C. to 115° C., for 0.5 to 6 hours, preferably 0.5 to 5 hours, and particularly preferably 1 to 4 hours.

Washing: at 0° C. to 110° C., preferably 30° C. to 100° C., and more preferably 30° C. to 90° C., from 1 to 20 times, preferably 1 to 15 times, and particularly preferably 1 to 10 times. Hydrocarbons used for washing are preferably aromatic hydrocarbons or saturated hydrocarbons which are liquid at normal temperatures. Specific examples include aromatic hydrocarbons such as toluene, xylene, and ethylbenzene, and saturated hydrocarbons such as hexane, heptane, and cyclohexane. The aromatic hydrocarbons are preferably used for the intermediate washing, whereas the saturated hydrocarbons are preferably used for the final washing.

The ratio of the compounds used for preparing the solid catalyst component (A) cannot be generically defined, because such a ratio varies according to the process employed. For example, the tetravalent titanium halide (b) is used in an amount of 0.5 to 100 mols, preferably 0.5 to 50 mols, still more preferably 1 to 10 mols; the electron donor compound (c) is used in an amount of 0.01 to 10 mols, preferably 0.01 to 1 mol, and still more preferably 0.02 to 0.6 mol; the aromatic hydrocarbons (d) are used in an amount of 0.001 to 500 mols, preferably 0.001 to 100 mols, and still more preferably 0.005 to 10 mols; the polysiloxane (e) is used in an amount of 0.01 to 100 g, preferably 0.05 to 80 g, and still more preferably to 50 g; and the aluminum compound (f) is used in an amount of 0.01 to 10 mols, preferably 0.05 to 5 mols, and still more preferably 0.1 to 1 mol; for one mol of the dialkoxymagnesium (a).

There are also no specific limitations to the amount of titanium, magnesium, halogen atoms, and electron donor compounds in the solid catalyst component (A) of the present invention. The content of titanium is 1.0 to 8.0 wt %, preferably 2.0 to 8.0 wt %, and still more preferably 3.0 to 8.0 wt %; the content of magnesium is 10 to 70 wt %, preferably 10 to 50 wt %, more preferably 15 to 40 wt %, and particularly preferably 15 to 25 wt %; the content of halogen atoms is 20 to 90 wt %, preferably 30 to 85 wt %, more preferably 40 to 80 wt %, and particularly preferably 45 to 75 wt %; and the total amount of electron donor compounds is 0.5 to 30 wt %, preferably 1 to 25 wt %, and particularly preferably 2 to 20 wt %.

There are no specific limitations to the organoaluminum compound (B) (hereinafter may be simply referred to as "component (B)") used for preparing the catalyst for olefin polymerization of the present invention, inasmuch as the compound has a structure of the above formula (1). In the formula (1), an ethyl group and isobutyl group are preferable as $R^1$, a hydrogen atom, chlorine atom, and bromine atom are preferable as Q, and p is preferably an integer of 2 or 3, and particularly preferably 3. As specific examples of such an organoaluminum compound (B), triethylaluminum, diethylaluminum chloride, triisobutylaluminum, diethylaluminum bromide, and diethylaluminum hydride can be given. These compounds may be used either individually or in combination of two or more. Triethylaluminum and triisobutylaluminum are preferably used.

The compounds represented by the above formula (2) can be given as the aminosilane compound (C) (hereinafter may be simply referred to as "component (C)") which can be used for preparing the catalyst for olefin polymerization of the present invention. The amino silane compound has a silicon atom to which the nitrogen atom of a perhydroquinolino group or perhydroisoquinolino group bonds. Specific examples of the aminosilane compound include bis(perhydroquinolino)dialkoxysilane, bis(perhydroisoquinolino)dialkoxysilane, perhydroquinolinoalkyldialkoxysilane, and perhydroisoquinolinoalkyldialkoxysilane. Among the compounds represented by the above formula (2), those having the same group for $R^2$ and $R^3$ are preferable, with a compound having the same group for $R^2$, $R^3$, and $R^4$ being particularly preferable. A perhydroisoquinolino group is particularly preferable as $R^2$. As $R^4$, an alkyl group having 1 to 4 carbon atoms is preferable, with a methyl group being particularly preferable.

Specific examples include the following compounds: bis(perhydroquinolino)dimethoxysilane, bis(perhydroquinolino)diethoxysilane, bis(perhydroisoquinolino)dimethoxysilane, bis(perhydroisoquinolino)diethoxysilane, ethyl(perhydroquinolino)dimethoxysilane, ethyl(perhydroisoquinolino)dimethoxysilane, n-propyl(perhydroquinolino)dimethoxysilane, n-propyl(perhydroisoquinolino)dimethoxysilane, isopropyl(perhydroquinolino)dimethoxysilane, isopropyl(perhydroisoquinolino)dimethoxysilane, butyl(perhydroquinolino)dimethoxysilane, butyl(perhydroisoquinolino)dimethoxysilane, isopropyl(perhydroquinolino)dimethoxysilane, isopropyl(perhydroisoquinolino)dimethoxysilane, t-butyl(perhydroquinolino)dimethoxysilane, t-butyl(perhydroisoquinolino)dimethoxysilane, pentyl(perhydroquinolino)dimethoxysilane, pentyl(perhydroisoquinolino)dimethoxysilane, isopentyl(perhydroquinolino)dimethoxysilane, isopentyl(perhydroisoquinolino)dimethoxysilane, cyclopentyl(perhydroquinolino)dimethoxysilane, cyclopentyl(perhydroisoquinolino)dimethoxysilane, cyclohexyl(perhydroquinolino)dimethoxysilane, cyclohexyl(perhydroisoquinolino)dimethoxysilane, phenyl(perhydroquinolino)dimethoxysilane, and phenyl(perhydroisoquinolino)dimethoxysilane. These compounds may be used either individually or in combination of two or more. Of these, bis (perhydroquinolino)dimethoxysilane and bis(perhydroisoquinolino)dimethoxysilane are preferable.

In addition to the above components, an organosilicon compound other than the above-described aminosilane compound (hereinafter may be simply referred to as "component (D)") may be used for preparing the catalyst for olefin polymerization of the present invention. As an example of such an organosilicon compound (D), a compound of the following formula (3) can be given.

wherein $R^8$ individually represents an alkyl group having 1 to 12 carbon atoms, cycloalkyl group, phenyl group, vinyl group, allyl group, or aralkyl group, $R^9$ individually represents an alkyl group having 1 to 4 carbon atoms, cycloalkyl group, phenyl group, vinyl group, allyl group, or aralkyl group, and q is an integer satisfying an inequality of $0 \leq q \leq 3$. As specific examples, phenylalkoxysilane, alkylalkoxysilane, phenylalkylalkoxysilane, cycloalkylalkoxysilane, and cycloalkylalkylalkoxysilane can be given.

As more specific examples of the above organosilicon compound (D), di-n-propyldimethoxysilane, diisopropyldimethoxysilane, di-n-butyldimethoxysilane, diisobutyldimethoxysilane, di-t-butyldimethoxysilane, di-n-butyldiethoxysilane, t-butyltrimethoxysilane, dicyclohexyldimethoxysilane, dicyclohexyldiethoxysilane, cyclohexylmethyldimethoxysilane, cyclohexylmethyldiethoxysilane, cyclohexylethyldimethoxysilane, cyclohexylethyldiethoxysilane, dicyclopentyldimethoxysilane, dicyclopentyldiethoxysilane, cyclopentylmethyldimethoxysilane, cyclopentylmethyldiethoxysilane, cyclopentylethyldiethoxysilane, cyclohexylcyclopentyldimethoxysilane, cyclohexylcyclopentyldiethoxysilane, 3-methylcyclohexylcyclopentyldimethoxysilane, 4-methylcyclohexylcyclopentyldimethoxysilane, and 3,5-dimethylcyclohexylcyclopentyldimethoxysilane can be given. These organosilicon compounds (D) can be used individually or in a combination of two or more.

In the case where the above components (D) are used in combination, the preferable combinations with the above components (C) are as shown in Table 1.

TABLE 1

| Component (C) | Component (D) |
|---|---|
| (1) Bis(perhydroisoquinolino)dimethoxysilane | Diisopropyldimethoxysilane |
| (2) Bis(perhydroisoquinolino)dimethoxysilane | Diisobutyldimethoxysilane |
| (3) Bis(perhydroisoquinolino)dimethoxysilane | Cyclohexylmethyldimethoxysilane |
| (4) Bis(perhydroisoquinolino)dimethoxysilane | Dicyclopentyldimethoxysilane |
| (5) Bis(perhydroisoquinolino)dimethoxysilane | Cyclohexylcyclopentyldimethoxysilane |

Olefins can be polymerized or copolymerized using the catalyst for olefin polymerization of the present invention. As olefins, ethylene, propylene, 1-butene, 1-pentene, 4-methyl-1-pentene, vinyl cyclohexane, and the like can be used either individually or in combination of two or more. Of these, ethylene, propylene, and 1-butene can be suitably used. A particularly preferable olefin is propylene. Propylene may be copolymerized with other olefins. As olefins to be copolymerized, ethylene, 1-butene, 1-pentene, 4-methyl-1-pentene, vinyl cyclohexane, and the like can be used either individually or in combination of two or more. Of these, ethylene and 1-butene can be suitably used.

The ratio of each component used is not specifically limited inasmuch as such a ratio does not influence the effect of the present invention. Usually, the component (B) is used in the amount of 1 to 2000 mols, and preferably 50 to 1000 mols, per one mol of titanium atom in the component (A). The component (C) is used in the amount of 0.002 to 10 mols, preferably 0.01 to 2 mols, and particularly preferably 0.01 to 0.5 mols, per one mol of the component (B). If the component (D) is used in combination, the amount is 0.002 to 10 mols, preferably 0.01 to 2 mols, and particularly preferably 0.01 to 0.5 mols, per one mol of the component (B) and 0.01 to 100 mols, preferably 0.1 to 10 mols, and particularly preferably 0.1 to 1 mol, per one mol of the component (C).

Although the order of contact of these components is optional, it is desirable to first add the organoaluminum compound (B) to the polymerization system, then cause the amino silane compound (C) or a mixture of the components (C) and (D) to contact the organoaluminum compound (B), or cause the component (C) and component (D) in an optional order to contact the organoaluminum compound (B), and cause the solid catalyst component (A) to contact the resulting mixture. A method of forming a catalyst by adding the organoaluminum compound (B) to the polymerization system, separately causing the component (A) to contact the component (C) or the components (C) and (D), and feeding the contacted component (A) and component (C) or the components (C) and (D) to the polymerization system is also a preferable embodiment. It is possible to further improve the catalyst activity against hydrogen and crystalline properties of the resulting polymer by using a previously contacted mixture of the component (A) and component (C) or the components (C) and (D).

The polymerization of the present invention can be carried out either in the presence or in the absence of an organic solvent. Olefin monomers such as propylene may be used either in a gaseous state or in a liquid state. The polymerization reaction is preferably carried out at a temperature of 200° C. or less, and preferably at 100° C. or less, under a pressure of 10 MPa or less, and preferably 5 MPa or less. Either a continuous polymerization system or a batch polymerization system maybe used for the polymerization reaction. In addition, the polymerization can be completed either in one step or in two or more steps.

In polymerizing olefins using the catalyst containing the component (A), component (B), and component (C) (hereinafter may be referred to as "main polymerization"), it is desirable to proceed prepolymerization of the olefins prior to the main polymerization to further improve the catalyst activity, stereoregularity, properties of resulting polymer particles, and the like. In addition to the olefins used in the main polymerization, monomers such as styrene can be used in the preliminary polymerization. Specifically, after causing the component (A) to contact the component (B) and/or the component (C) in the presence of olefins to prepolymerize 0.1 to 100 g of the polyolefins for 1 g of the component (A), the component (B) and/or the component (C) are further caused to contact to form the catalyst. In the case where the component (D) is used in combination, it is possible to cause the component (A) to contact the components (B) and (D) in the presence of olefins during the prepolymerization and to use the component (C) during the main polymerization.

Although the order of contact of the components and monomers in carrying out the prepolymerization is optional, it is desirable to first add the component (B) to the prepolymerization system in an inert gas or olefin gas atmosphere such as propylene, cause the component (A) to contact the component (B), and then cause one or more olefins such as propylene to contact the mixture.

The polymerization of olefins in the presence of the catalyst for olefin polymerization prepared by the process of the present invention can produce olefin polymers with a molecular weight distribution broader than that of the polymers produced using a conventional catalyst. In addition, the catalyst for olefin polymerization of the present invention exhibits the same performance as conventional catalysts in catalyst activity and the capability of producing polymers with high stereoregularity. Specifically, the catalyst of the present invention has been confirmed to produce polymers with a broader molecular weight distribution, while maintaining the catalyst activity and crystalline properties of the polymers.

EXAMPLES

The present invention will be described in more detail by examples, which should not be construed as limiting the present invention.

Example 1

(Preparation of Solid Catalyst Component)

A 2,000 ml round bottom flask equipped with a stirrer, of which the internal atmosphere had been sufficiently replaced by nitrogen gas, was charged with 150 g of diethoxymagnesium and 750 ml toluene to prepare a suspension. The suspension was added to a solution of 450 ml of toluene and 300 ml of titanium tetrachloride in another 2,000 ml round bottom flask equipped with a stirrer, of which the internal atmosphere had been sufficiently replaced by nitrogen gas. The suspension was reacted at 5° C. for one hour (low temperature aging process). After the addition of 22.5 ml of di-n-butyl phthalate, the mixture was heated to 90° C. and reacted for two hours with stirring (first process). After the reaction, the resulting reaction mixture was washed four times with 1,300 ml of toluene at 80° C. (intermediate washing). After the addition of 1,200 ml of toluene and 300 ml of titanium tetrachloride, the reaction mixture was heated to 112° C. and reacted for two hours with stirring (second process). The intermediate washing and second process were repeated once more. The resulting reaction mixture was washed seven times with 1,300 ml of heptane at 40° C., filtered, and dried to obtain a solid catalyst component (A) in the form of a powder. The content of titanium in the solid catalyst component was analyzed and found to be 2.9 wt %.

(Preparation of Polymerization Catalyst and Polymerization)

A 2.0 l autoclave equipped with a stirrer, of which the internal atmosphere had been entirely replaced by nitrogen gas, was charged with 1.32 mmol of triethylaluminum, 0.13 mmol of bis(perhydroisoquinolino)dimethoxysilane, and the above solid catalyst component (A), in terms of the titanium atom contained therein, in an amount of 0.0026 mmol, thereby forming a polymerization catalyst. Then, with the addition of 2.0 l of hydrogen gas and 1.4 l of liquid propylene, the prepolymerization was carried out for 5 minutes at 20° C., followed by heating the prepolymerized product, and the main polymerization was carried out for one hour at 70° C. The polymerization activity per 1 g of the solid catalyst component was calculated according to the following formula.

Polymerization activity=Produced polymer $(F)(g)$/Solid catalyst component $(g)$ The polymer (G) insoluble in n-heptane determined by extracting this polymer for 6 hours in boiling n-heptane was measured to determine the proportion of components insoluble in boiling n-heptane (HI) in this polymer according to the following formula.

$HI=(G)(g)/(F)(g)$

Xylene soluble components (XS) in the polymer were determined as follows. Method for measuring xylene soluble components: 4.0 g of the polymer was added to 200 ml of p-xylene and dissolved while maintaining the mixture at the boiling point (138° C.) over two hours. The mixture was cooled to 23° C. and the soluble matters were separated from insoluble matters by filtration. The soluble components were dried with heating, and the polymer thus obtained was determined as xylene soluble components (wt %). The melt index (MI) of the polymer was determined according to the test method conforming to ASTM D1238 or JIS K7210.

(Molecular Weight Distribution of Polymer)

The molecular weight distribution of polymers was evaluated by the ratio (Mw/Mn) of the weight average molecular weight (Mw) to the number average molecular weight (Mn) and the ratio (Mz/Mw) of the Z-average molecular weight (Mz) to the weight average molecular weight (Mw), measured by cross fractionation chromatography (CFC) using CFC T-150B (manufactured by Mitsubishi Chemical Corp.) under the following conditions.

Solvent: o-dichlorobenzene (ODCB)
Temperature: 143° C. (SEC)
Column: Shodex GPC UT-806M
Sample concentration: 4 g/l-ODCB (200 mg/50 ml-ODCB)

Charge amount: 0.5 ml
Flow rate: 1.0 ml/min
Temperature: 0° C. to 140° C.
(Measurement of Polydispersity Index (PI))

Polydispersity index (PI) was measured using a dynamic stress rheometer (DSR) using SR-500 manufactured by Rheometric Scientific, Inc. Additives described below were added to samples to prevent the samples from becoming deteriorated due to heat.

Measurement mode: Frequency sweeping mode
Temperature: 200° C.
Stress: 2,000 dyn/cm$^2$
Frequency range: 100 to 0.1 rad/sec.
Additive: A slurry prepared by mixing 4 g of 2,6-dibutyl-p-cresol, 8 g of DLTP (Lasmit), 2 g of calcium stearate, 6 g of Mark 260 (ADK STAB), and 200 ml or more of acetone was added to the polymers in the following ratio.
Ratio (slurry/polymer): 5 ml/5 g Polymerization activity, heptane insoluble (HI), melt index (MI), xylene soluble (XS), molecular weight distribution (Mw/Mn) and (Mz/Mw), and polydispersity index (PI) are described in Table 2.

Example 2
(Preparation of Solid Catalyst Component)

A 2,000 ml round bottom flask equipped with a stirrer, of which the internal atmosphere had been sufficiently replaced by nitrogen gas, was charged with 150 g of diethoxymagnesium and 750 ml toluene to prepare a suspension. The suspension was added to a solution of 450 ml of toluene and 300 ml of titanium tetrachloride in another 2,000 ml round bottom flask equipped with a stirrer, of which the internal atmosphere had been sufficiently replaced by nitrogen gas. The suspension was reacted at 5° C. for one hour (low temperature aging process) After the addition of 22.5 ml of di-n-butyl phthalate, the mixture was heated to 100° C. Then, 30 ml of cyclic polysiloxane (decamethylcyclopentasiloxane "TFS-405" manufactured by GE Toshiba Silicones Co., Ltd.) was added. The mixture was heated to 105° C. and reacted for two hours with stirring (first process). After the reaction, the resulting reaction mixture was washed four times with 1,300 ml of toluene at 80° C. (intermediate washing). After the addition of 1,200 ml of toluene and 300 ml of titanium tetrachloride, the reaction mixture was heated to 112° C. and reacted for two hours with stirring (second process) The intermediate washing and second process were repeated once more. The resulting reaction mixture was washed seven times with 1,300 ml of heptane at 40° C., filtered, and dried to obtain a solid catalyst component (A) in the form of a powder. The content of titanium in the solid catalyst component was analyzed and found to be 3.1 wt %.

A polymerization catalyst was prepared and polymerization was carried out in the same manner as in Example 1, except for using the solid catalyst component prepared above. The molecular weight distribution of the polymer was evaluated and the polydispersity index (PI) was measured in the same manner as in Example 1. The results are shown in Table 2.

Example 3

A polymerization catalyst component and a catalyst were prepared and polymerization was carried out in the same manner as in Example 1, except that dineopentyl 4-bromophthalate was used instead of di-n-butyl phthalate for preparing the solid catalyst component. The molecular weight distribution of the polymer was evaluated and the polydispersity index (PI) was measured in the same manner as in Example 1. The results are shown in Table 2. The content of titanium in the solid catalyst component was analyzed and found to be 2.9 wt %.

Example 4
(Preparation of Solid Catalyst Component)

A 500 ml round bottom flask equipped with a stirrer, of which the internal atmosphere had been sufficiently replaced by nitrogen gas, was charged with 10 g of diethoxymagnesium, 1.5 g of aluminum trichloride, and 90 ml of toluene to prepare a suspension. After the addition of 22 ml of titanium tetrachloride at room temperature, the mixture was reacted while heating to 80° C. with stirring. Then, 3.3 ml of di-n-butyl phthalate and 3.0 ml of dimethylpolysiloxane with a viscosity of 50 cst at room temperature were added. The mixture was heated to 110° C. and reacted for 2 hours (first reaction process). After the reaction, the supernatant liquid was removed and the residue was washed three times with 88 ml of toluene at 75° C. 89 ml of toluene and 22 ml of titanium tetrachloride were added and the mixture was stirred for 1.5 hours at 100° C. (second reaction process). The reaction mixture was washed eight times with 83 ml of n-heptane at 40° C. to obtain a solid catalyst component. The content of titanium in the solid catalyst component was analyzed and found to be 3.3 wt %. The content of aluminum was 0.5 wt %.

A polymerization catalyst was prepared and polymerization was carried out in the same manner as in Example 1, except for using the solid catalyst component prepared above. The molecular weight distribution of the polymer was evaluated and the polydispersity index (PI) was measured in the same manner as in Example 1. The results are shown in Table 2.

Comparative Example 1

A 2,000 ml round bottom flask equipped with a stirrer, of which the internal atmosphere had been sufficiently replaced by nitrogen gas, was charged with 95.2 g of magnesium dichloride, 442 ml of decane, and 390.6 g of 2-ethylhexyl alcohol. The mixture was reacted at 130° C. for two hours to obtain a homogeneous solution. 21.3 g of phthalic anhydride was added to the solution and the mixture was stirred at 130° C. for one hour to dissolve the phthalic anhydride, thereby obtaining a homogeneous solution. After cooling to room temperature, 75 ml of the homogeneous solution was added to 200 ml of titanium tetrachloride. The mixture was heated to 110° C., 5.22 g of diisobutyl phthalate was added, and the mixture was reacted for two hours with stirring. After the reaction, the reaction product was suspended again in 275 ml of titanium tetrachloride and processed for two hours at 110° C. The resulting reaction mixture was washed seven times with heptane at 40° C., filtered, and dried to obtain a solid catalyst component in the form of a powder. The content of titanium in the solid catalyst component was analyzed and found to be 2.8 wt %. A polymerization catalyst was prepared and polymerization was carried out in the same manner as in Example 1, except for using the solid catalyst component prepared above. The molecular weight distribution of the polymer was evaluated and the polydispersity index (PI) was measured in the same manner as in Example 1. The results are shown in Table 2.

Comparative Example 2

A polymerization catalyst component and a catalyst were prepared and polymerization was carried out in the same manner as in Example 1, except that cyclohexylmethyldimethoxysilane was used instead of bis(perhydroisoquinolino)dimethoxysilane for preparing the solid catalyst component. The molecular weight distribution of the polymer was evaluated and the polydispersity index (PI) was measured in the same manner as in Example 1. The results are shown in Table 2.

TABLE 2

| Example | Polymerization Activity (g-PP/g-cat.) | HI (wt %) | MI (g/10 min) | XS (wt %) | Mw/Mn | Mz/Mw | PI |
|---|---|---|---|---|---|---|---|
| Example 1 | 43500 | 98.3 | 7.0 | 1.6 | 12.9 | 14.1 | 8.0 |
| Example 2 | 45500 | 98.5 | 6.5 | 1.4 | 10.5 | 13.2 | 7.5 |
| Example 3 | 46300 | 97.8 | 13 | 2.0 | 14.2 | 50.4 | 7.9 |
| Example 4 | 41700 | 96.5 | 9.5 | 3.5 | 15.3 | 51.1 | 8.2 |
| Comparative Example 1 | 35400 | 98.1 | 4.5 | 2.3 | 9.6 | 12.9 | 7.1 |
| Comparative Example 2 | 48400 | 98.2 | 6.8 | 1.7 | 6.6 | 9.0 | 4.3 |

As can be seen from the above results, polymers produced by using the catalyst of the present invention has stereoregularity equivalent to or higher than that of the polymers obtained by conventional catalysts shown in Comparative Examples 1 and 2, as well as a remarkably broader molecular weight distribution represented by Mw/Mn or Mz/Mw. In particular, the high Mz/Mw ratio indicates an increase of polymers in a high molecular weight region, resulting in a remarkably broadened molecular weight distribution. Furthermore, notwithstanding the broad molecular weight distribution, the high melt index (MI) possessed by the polymers prepared in Examples, equivalent to or higher than that of the polymers produced in Comparative Examples 1 and 2, indicates high activity against hydrogen of the catalyst.

Industrial Applicability

Olefin polymers with a broad molecular weight distribution can be obtained by polymerizing olefins using the catalyst of the present invention, while maintaining the high stereoregularity of the polymers. Polymers have increased melting viscoelasticity, whereby the problem of restricted application due to impaired fabrication properties and appearance of the products can be solved. In addition, the catalyst exhibits activity against hydrogen equivalent to or higher than the activity exhibited by conventional catalysts, whereby polymers with a high melt flow rate can be obtained.

What is claimed is:

1. A catalyst for olefin polymerization, comprising:
(A) a solid catalyst component prepared by reacting (a) a dialkoxymagnesium, (b) a tetravalent titanium halide compound, and (c) an electron donor compound,
(B) an organoaluminum compound of the following formula (1), $$R^1_p AlQ_{3-p} \quad (1)$$

wherein $R^1$ represents an alkyl group having 1 to 4 carbon atoms, Q represents a hydrogen atom or a halogen atom, and p represents a real number satisfying the formula $0<p \leq 3$, and
(c) an aminosilane compound of the following formula (2), $$R^2R^3Si(OR^4)_2 \quad (2)$$

wherein $R^2$ represents a perhydroquinolino group or perhydroisoquinolino group, $R^3$ represents a perhydroquinolino group, perhydroisoquinolino group, an alkyl group having 1 to 12 carbon atoms, a cycloalkyl group, phenyl group, vinyl group, allyl group, or aralkyl group, the $R^3$ group being either the same as or different from the $R^2$ group, and $R^4$ individually represents an alkyl group having 1 to 4 carbon atoms, a cycloalkyl group, phenyl group, vinyl group, allyl group, or aralkyl group.

2. The catalyst for olefin polymerization according to claim 1, wherein the solid catalyst component (A) is prepared by reacting (a) a dialkoxymagnesium, (b) a tetravalent titanium halide compound, (c) an electron donor compound, and (d) an aromatic hydrocarbon.

3. The catalyst for olefin polymerization according to claim 1, wherein the solid catalyst component (A) is prepared by reacting (a) a dialkoxymagnesium, (b) a tetravalent titanium halide compound, (c) an electron donor compound, (d) an aromatic hydrocarbon, and (e) a polysiloxane.

4. The catalyst for olefin polymerization according to claim 1, wherein the dialkoxymagnesium (a) is diethoxymagnesium.

5. The catalyst for olefin polymerization according to claim 1, wherein the electron donor compound (c) is a phthalic acid diester.

6. The catalyst for olefin polymerization according to claim 1, wherein the electron donor compound (c) is a phthalic acid diester derivative.

7. The catalyst for olefin polymerization according to claim 6, wherein the phthalic acid diester derivative is 4-bromophthalic acid diester.

8. A process for polymerizing olefins, comprising:
polymerizing or copolymerizing olefins in the presence of a catalyst for olefin polymerization comprising:
(A) a solid catalyst component prepared by reacting (a) a dialkoxymagnesium, (b) a tetravalent titanium halide compound, and (c) an electron donor compound,
(B) an organoaluminum compound of the following formula (1), $$R^1_p AlQ_{3-p} \quad (1)$$

wherein $R^1$ represents an alkyl group having 1 to 4 carbon atoms, Q represents a hydrogen atom or a halogen atom, and p represents a real number satisfying the formula $0<p \leq 3$, and
(C) an aminosilane compound of the following formula (2), $$R^2R^3Si(OR^4)_2 \quad (2)$$

wherein $R^2$ represents a perhydroquinolino group or perhydroisoquinolino group, $R^3$ represents a perhydroquinolino group, perhydroisoquinolino group, an alkyl group having 1 to 12 carbon atoms, a cycloalkyl group, phenyl group, vinyl group, allyl group, or aralkyl group, the $R^3$ group being either the same as or different from the $R^2$ group, and $R^4$ individually represents an alkyl group having 1 to 4 carbon atoms, a cycloalkyl group, phenyl group, vinyl group, allyl group, or aralkyl group.

9. The process for polymerizing olefins according to claim 8, wherein the solid catalyst component (A) is prepared by reacting (a) a dialkoxymagnesium, (b) a tetravalent titanium halide compound, (c) an electron donor compound, and (d) an aromatic hydrocarbon.

10. The process for polymerizing olefins according to claim 8, wherein the solid catalyst component (A) is prepared by reacting (a) a dialkoxymagnesium, (b) a tetravalent titanium halide compound, (c) an electron donor compound, (d) an aromatic hydrocarbon, and (e) a polysiloxane.

11. The process for polymerizing olefins according to claim 8, wherein the dialkoxymagnesium (a) is diethoxymagnesium.

12. The process for polymerizing olefins according to claim 8, wherein the electron donor compound (c) is a phthalic acid diester.

13. The process for polymerizing olefins according to claim 8, wherein the electron donor compound (c) is a phthalic acid diester derivative.

14. The process for polymerizing olefins according to claim 13, wherein the phthalic acid diester derivative is 4-bromophthalic acid diester.

15. The catalyst for olefin polymerization according to claim 1, wherein the solid catalyst component (A) is prepared by a process comprising suspending the dialkoxymagnesium (a) in an aromatic hydrocarbon (d) and causing the resulting suspension to contact the tetravalent titanium halide (b), then the electron donor compound (c), or by a process comprising suspended the dialkoxymagnesium (a) in an aromatic hydrocarbon (d) and causing the suspension to contact the electron donor compound (c), then the tetravalent titanium halide (b).

16. The process for polymerizing olefins according to claim 8, wherein the solid catalyst component (A) is prepared by a process comprising suspending the dialkoxymagnesium (a) in an aromatic hydrocarbon (d) and causing the resulting suspension to contact the tetravalent titanium halide (b), then the electron donor compound (c), or by a process comprising suspending the dialkoxymagnesium (a) in an aromatic hydrocarbon (d) and causing the suspension to contact the electron donor compound (c), then the tetravalent titanium halide (b).

* * * * *